United States Patent
Collens et al.

(10) Patent No.: US 7,111,171 B2
(45) Date of Patent: Sep. 19, 2006

(54) PARALLEL DISTRIBUTION AND FINGERPRINTING OF DIGITAL CONTENT

(75) Inventors: Daniel A. Collens, Waterloo (CA); Stephen Watson, Toronto (CA); Michael A. Malcolm, Aspen, CO (US)

(73) Assignee: Kaleidescope, Inc., Mountain View, CA (US)

( * ) Notice: Subject to any disclaimer, the term of this patent is extended or adjusted under 35 U.S.C. 154(b) by 151 days.

(21) Appl. No.: 10/356,692

(22) Filed: Jan. 31, 2003

(65) Prior Publication Data

US 2004/0010694 A1 Jan. 15, 2004

Related U.S. Application Data

(63) Continuation of application No. 10/356,322, filed on Jan. 31, 2003.

(60) Provisional application No. 60/444,012, filed on Jan. 31, 2003, provisional application No. 60/394,922, filed on Jul. 9, 2002, provisional application No. 60/394,588, filed on Jul. 9, 2002, provisional application No. 60/394,630, filed on Jul. 9, 2002.

(51) Int. Cl.
*H04L 9/00* (2006.01)

(52) U.S. Cl. .................. 713/176; 713/177; 726/30; 726/32; 726/33; 726/26; 380/43; 380/203; 709/238

(58) Field of Classification Search ......... 713/167–176
See application file for complete search history.

(56) References Cited

U.S. PATENT DOCUMENTS

| | | |
|---|---|---|
| 5,337,357 A | 8/1994 | Chou et al. |
| 5,473,692 A | 12/1995 | Davis |
| 5,504,933 A | 4/1996 | Saito |
| 5,805,706 A | 9/1998 | Davis |
| 6,009,525 A | 12/1999 | Horstmann |
| 6,430,301 B1 | 8/2002 | Petrovic |
| 6,513,118 B1 | 1/2003 | Iwamura |
| 6,772,340 B1 * | 8/2004 | Peinado et al. ............. 713/168 |
| 6,801,999 B1 * | 10/2004 | Venkatesan et al. ........ 713/167 |
| 6,804,779 B1 | 10/2004 | Carroni et al. |
| 2001/0037465 A1 | 11/2001 | Hart, III et al. |

(Continued)

FOREIGN PATENT DOCUMENTS

| | | |
|---|---|---|
| WO | WO 01/98903 A1 | 12/2001 |
| WO | WO 2004/006494 A1 | 1/2004 |

OTHER PUBLICATIONS

Chu, Hao-hua, et al, 'A Secure Multicast Protocol with Copyright Protection ', ACM SIGCOMM Computer Comm. Review, vol. 32, #2, Apr. 2002, entire document, www.csie.ntu.edu.tw/~hchu; papers/multicast$_{13}$acm_ccr2002.pdf.*

(Continued)

*Primary Examiner*—Ayaz Sheikh
*Assistant Examiner*—Ronald Baum
(74) *Attorney, Agent, or Firm*—Swernofsky Law Group PC

(57) ABSTRACT

Distributing information, including the steps of watermarking the digital content, distributing the digital content using a multi-source system, and partially fingerprinting digital content at each stage of moving information from a point of origin to the viewer. "Adaptation" of the digital content to the recipient includes maintaining the digital content in encrypted form at each such intermediate device, including decrypting the digital content with a key unique to both the device and the specific movie, selecting a portion of the watermark locations into which to embed information, embedding fingerprinting information into those locations sufficient to identify the recipient, and encrypting the fingerprinted digital content with a new such key.

34 Claims, 3 Drawing Sheets

U.S. PATENT DOCUMENTS

| | | | |
|---|---|---|---|
| 2001/0051996 | A1 | 12/2001 | Cooper et al. |
| 2002/0087876 | A1 | 7/2002 | Larose |
| 2002/0095582 | A1 | 7/2002 | Peled et al. |
| 2003/0009671 | A1* | 1/2003 | Yacobi et al. ............... 713/176 |
| 2003/0161473 | A1 | 8/2003 | Fransdonk |
| 2003/0163684 | A1 | 8/2003 | Fransdonk |
| 2005/0010536 | A1 | 1/2005 | Cochran et al. |

OTHER PUBLICATIONS

Brown et al. "Watercasting: Distributed Watermarking of Multicast Media," 1999, http://csperkins.org/publications/discast.pdf.

Judge et al. "WHIM: Watermarking Multicast Video with a Hierarchy of Intermediaries." 2000, http://www.nossdav.org/2000/papers/29.pdf.

Mitsubishi. "CIPRESS White Paper." 2001, http://www.igd.fng.de/igd-a8/projects/cipress/publication/pdf/General.pdf.

Parviainen et al. "Large Scale Distributed Watermarking of Multicast Media Through Encryption." 2001, http://media.sm.luth.se/publications/2001/distmark.pdf.

* cited by examiner

PARALLEL DISTRIBUTION AND FINGERPRINTING OF DIGITAL CONTENT

CROSS REFERENCE TO RELATED APPLICATIONS

This application claims priority of the following documents, each of which is hereby incorporated by reference as if fully set forth herein.

U.S. provisional patent application 60/394,630, filed Jul. 9, 2002, in the name of Michael Malcolm, Stephen Watson, Daniel Collens, and Kevin Hui, titled "Watermarking and Fingerprinting a Movie for Secure Distribution."

U.S. provisional patent application 60/394,922, filed Jul. 9, 2002, in the name of Michael Malcolm, Stephen Watson, and Daniel Collens, titled "System Architecture of a System for Secure Distribution of Media."

U.S. provisional patent application 60/394,588, filed Jul. 9, 2002, in the name of Michael Malcolm, Stephen Watson, and Daniel Collens, titled "Topology of Caching Nodes in a System for Secure Delivery of Media Content."

U.S. provisional patent application 60/444,012, filed Jan. 31, 2003, in the name of Michael Malcolm, Stephen Watson, and Daniel Collens, titled "Watermarking and Fingerprinting a Movie for Secure Distribution."

U.S. patent application Ser. No. 10/356,322, filed Jan. 31, 2003, in the name of the same inventors as this application, titled "Watermarking and Fingerprinting Digital Content Using Alternative Blocks to Embed Information".

BACKGROUND OF THE INVENTION

1. Field of the Invention

The invention relates to distribution of digital content.

2. Related Art

Distribution of digital content for media streams, such as for example movies, is subject to several problems. One problem is that it is easy to make exact copies of digital content, thus allowing any recipient of that content to redistribute it, whether or not authorized to do so. It would be advantageous to be able to distribute digital content, particularly digital content for media streams, without fear of its unauthorized distribution. This would be particularly advantageous when it is desired to distribute digital content using a communication link, such as for example a computer network or other technique for distribution to end viewers (for example, either on demand, in anticipation of future demand, or in response to something else).

One known solution is to mark digital content with a "fingerprint," so that an unauthorized distributor of the content can be determined, thus hopefully deterring potential unauthorized distributors. However, fingerprinting of digital content is subject to several problems.

First, fingerprinting can require substantial computation and memory resources. If the fingerprint were to be embedded at a single point of origin, that point of origin would have to be scaled up in size and power commensurate with the number of movies and the number of end viewers requesting those movies.

Second, fingerprinting can require substantial amount of time to perform. If a media stream were to be distributed to end viewers starting at a selected release time, as is sometimes common for first-release movies, there would be a substantial delay in distribution at about the release time due to queuing of more requests for the media stream than could be handled in real-time.

Because of the relatively large amounts of data needed to be sent, it would be advantageous to distribute digital content for media streams in a tiered or cached system, that is, one in which the digital content is moved outward from a point of origin to devices that are closer to end viewers in terms of (1) cost for communication, (2) latency for sending and receiving messages, and other factors. However, conventional fingerprinting is substantially inconsistent with a system in which digital content is substantially distributed before the end viewer is known.

SUMMARY OF THE INVENTION

A method of distributing information, such as digital content for media streams, includes (1) watermarking the digital content, such as for example using a technique described in a related application for selecting watermarking locations and embedding fingerprinting information therein, "WATERMARKING AND FINGERPRINTING DIGITAL CONTENT USING ALTERNATIVE BLOCKS TO EMBED INFORMATION", (2) distributing the digital content using a multi-source system, such as one with a tiered or cached structure, and (3) partially fingerprinting digital content at each stage of moving information from a point of origin to the viewer, thus generating partially-fingerprinted digital content for maintenance at each intermediate device.

An aspect of the method includes maintaining the digital content in encrypted form at each such intermediate device. To send digital content to any receiving device, (1) the sending device decrypts the digital content with a key unique to both the sending device and the specific content, (2) the sending device selects a portion of the watermark locations into which to embed information and embeds fingerprinting information into those locations sufficient to identify the recipient, and (3) the sending device encrypts the fingerprinted digital content with a new key, unique to both the receiving device and the specific content, and preferably unique to the particular transaction of sending the digital content. This process of decryption→partial fingerprinting→re-encryption is herein sometimes called "adaptation" of the digital content to the recipient.

In a preferred embodiment, a network of caching devices maintains the digital content for distribution to end viewers. Adaptation is performed whenever the digital content is transferred from any sender to any recipient within the network, including transfers between caches at the same or similar distances from the point of origin. Although it is possible as a consequence for the viewer to receive digital content that has been partially fingerprinted for multiple recipients, the preferred method of fingerprinting, provides for detecting individual recipients anyway.

In a preferred embodiment, the number of watermark locations to be actually embedded with fingerprinting information is selected in response to both the perceived security of the recipient and resources available for embedding fingerprinting information. In a first example, a point of origin might select about $10^2$ such locations when sending digital content to each one of a collection of L1 (first level) caches, the L1 caches might select about $10^4$ such locations when sending digital content to each one of about $10^3$ L2 caches, the L2 caches might select about $10^6$ such locations when sending digital content to each one of about $10^5$ L3 caches, and the L3 caches might select about $10^8$ such locations when sending digital content to each one of about $10^6$ end viewers.

DETAILED DESCRIPTION OF THE PREFERRED EMBODIMENT

Figure 1:
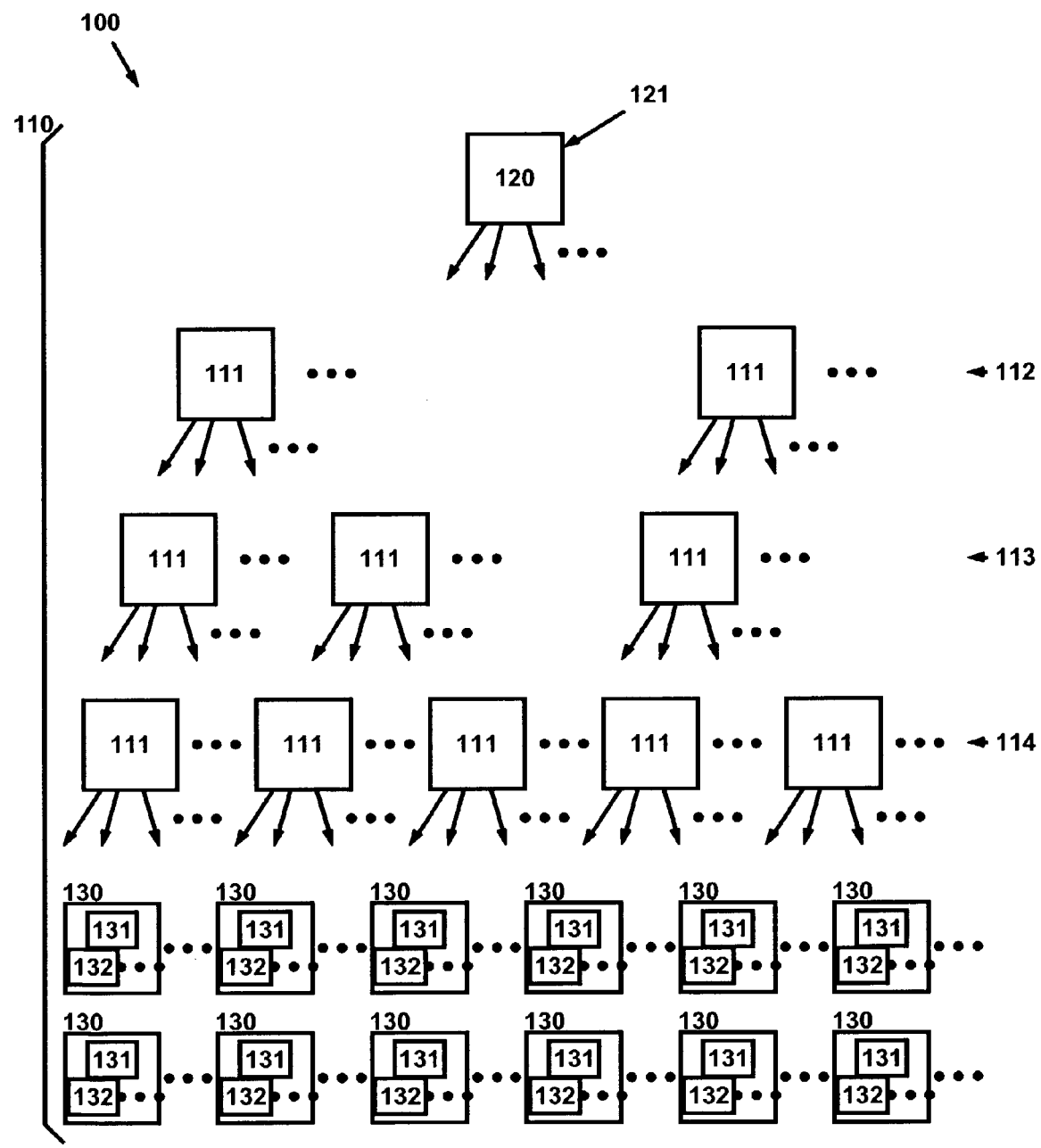
FIG. 1 shows a block diagram of a system for distribution of digital content, including parallel distribution and fingerprinting of digital content.

In the following description, a preferred embodiment of the invention is described with regard to preferred process steps and data structures. Those skilled in the art would recognize after perusal of this application that embodiment of the invention can be implemented using one or more general-purpose processors or special-purpose processors or other circuits adapted to particular process steps and data structures described herein, and that implementation of particular process steps and data structures would not require undue experimentation or further invention.

Lexicography

The following terms refer or relate to aspects of the invention as described below. The descriptions of general meanings of these terms are not intended to be limiting, only illustrative.

The phrase "media stream" describes information intended for presentation in a sequence, such as motion pictures including a sequence of frames or fields, or such as audio including a sequence of sounds. As used herein, the phrase "media stream" has a broader meaning than the standard meaning for "streaming media," (of sound and pictures that are transmitted continuously using packets and that start to play before all of the content arrives). Rather, as described herein, there is no particular requirement that "media streams" must be delivered continuously. Also as described herein, media streams can refer to other information for presentation, such as for example animation or sound, as well as to still media, such as for example pictures or illustrations, and also to databases and other collections of information.

The phrase "digital content" describes data in a digital format, intended to represent media streams or other information for presentation to an end viewer. "Digital content" is distinguished from packaging information, such as for example message header information. For the two phrases "digital content" and "media stream," the former describes a selected encoding of the latter, while the latter describes a result of presenting any encoding thereof.

The phrase "embedding information in media streams" describes generating a set of digital content for that media stream, for which the digital content both represents the media stream and also includes the embedded information in a form capable of later detection.

The term "watermark" describes a schema for digital content by which information can be embedded into that digital content. As described herein, an attacker cannot easily remove the watermark provided by the invention. However, the concept of a watermark as described herein is sufficiently general to include watermarks that are not so resistant to attack. As described herein, the watermark provided by the invention includes, within the media stream, both a set of locations at which to embed information and possible alterations to make at those locations by which information is embedded. However, the concept of a watermark as described herein is sufficiently general to include watermarks using other techniques for embedding information.

The term "fingerprint" describes a specific set of information sufficient to identify at least one designated recipient of digital content. As described herein, multiple attackers colluding together cannot easily remove the fingerprint provided by the invention, or prevent at least one of them from being detected as unauthorized distributor of the digital content. However, the concept of the fingerprint as described herein is sufficiently general to include fingerprints that are not so resistant to removal, or do not provide such capability for detecting unauthorized distributors of the digital content. As described herein, the fingerprint provided by the invention includes, within the media stream, a specific set of alterations to make at the locations identified by the watermark. However, the concept of the fingerprint as described herein is sufficiently general to include fingerprints using other techniques for embedding information, detecting the embedded information, and detecting unauthorized distributors of the digital content.

The term "adaptation" describes a process in which a sender delivers digital content to a recipient. As described herein, the sender decrypts its copy of the digital content, embeds information in the media stream represented by that digital content (thus partially fingerprinting that digital content), and re-encrypts that partially fingerprinted digital content. The sender delivers the adapted digital content to the recipient.

The phrase "end viewer" describes a recipient of the media stream for whom decoding of the digital content for the media stream, and presentation of the media stream, is contemplated.

The term "end viewer premises" describes premises where presentation of media streams to an end viewer is contemplated.

The term "decoding" describes generating data in a form for presentation of the media stream, in response to the digital content for the media stream in an encoded format. As described herein, the encoded format might include an industry standard encoded format such as MPEG-2. However, the concept of decoding as described herein is sufficiently general to include other encoding formats for media stream.

The term "presentation" describes generating information in a form for viewing of the media stream, such as for example audio and visual information for viewing a movie. As described herein, presentation of a movie might include visual display of the frames or fields of motion picture, as well as audio presentation of a soundtrack associated with that motion picture. However, the concept of presentation as described herein is sufficiently general to include a wide variety of other forms of generating information for reception by end viewers, including audio, visual, or otherwise.

The phrases "original movie" and "alt-movie" describe alternative versions of the same media stream, such as one being an original version of that media streams introduced into a system using aspects of the invention, and another being an alternative version of that same media streams generated in response to the original movie. Similarly, the phrases "original block" and "alt-block" describe alternative versions of the same individual block or macroblock within the original movie or alt-movie. As described herein, a difference between the original movie and the alt-movie is historical, in that the alt-movie can be substituted for the original movie in nearly every respect. Similarly, a difference between any one original block and its associated alt-block is historical, in that the alt-block can be substituted for the original block in nearly every respect.

Other and further applications of the invention, including extensions of these terms and concepts, would be clear to those of ordinary skill in the art after purchasing this application. These other and further applications are part of the scope and spirit of the invention, and would be clear to those of ordinary skill in the art without further invention or undue experimentation.

System Elements

FIG. 1 shows a block diagram of a system for distribution of digital content, including parallel distribution and fingerprinting of digital content.

A system 100 includes a video distribution network 110, the video distribution network 110 including at least one injection origin 120 and the video distribution network 110 including a plurality of end viewer premises 130.

1. Distribution from the Injection Origin to the End Viewer Premises.

The injection origin 120 receives digital content 121 for media streams from sources outside the video distribution network 110. In a preferred embodiment, these sources might include content producers or content aggregators, such as for example movie production studios, television studios, or radio or television network syndicators. If necessary, the injection origin 120 formats the digital content 121, watermarks it, and encrypts it for storage at the injection origin 120. In a preferred embodiment, the injection origin 120 uses a method of watermarking such as for example described in related applications for watermarking digital content ("WATERMARKING AND FINGERPRINTING DIGITAL CONTENT USING ALTERNATIVE BLOCKS TO EMBED INFORMATION").

The video distribution network 110 includes a network of caching devices 111, each capable of acting individually or in concert, to receive, store, and distribute the digital content 121 from the injection origin 120 to end viewer premises 130 for presentation to one or more end viewers. In a preferred embodiment, requests from end viewers prompt the video distribution network 110 to distribute the digital content 121 to end viewer premises 130, thus using a "pull" model for distribution. However, in alternative embodiments, the injection origin 120 or another device may prompt the video distribution network 110 to distribute the digital content 121 to end viewer premises 130, thus alternatively using a "push" model or another model for distribution.

In a preferred embodiment, the caching devices 111 are disposed in a tiered distribution system, including primary caches 112, intermediate caches 113, and leaf caches 114. The primary caches 112 receive the digital content 121 directly from the injection origin 120. The intermediate caches 113 receive the digital content 121 from primary caches 112, or from other intermediate caches 113 closer by the network topology to the injection origin 120. The leaf caches 114 receive the digital content 121 from intermediate caches 113, or possibly directly from primary caches 112, and distribute the digital content 121 directly to end viewer premises 130.

In a preferred embodiment, the video distribution network 110 includes a redundant communication network, such as the Internet or a secure subset thereof. However, in the context of the invention there is no particular requirement for the video distribution network 110 to use any particular communication technique. In alternative embodiments, any communication technique capable of delivering copies of the digital content 121 from the injection origin 120, through the video distribution network 110, and ultimately to end viewer premises 130, would also be suitable.

In a preferred embodiment, distribution of digital content 121 using the video distribution network 110 provides that copies of the digital content 121 might be recorded and maintained at multiple caching devices 111, and might be delivered using more than one pathway from the injection origin 120 to the end viewer premises 130.

For a first example, copies of the digital content 121 might be delivered from the injection origin 120 to two different intermediate caches 113 (A and B), and from those intermediate caches 113 (A and B) to multiple end viewer premises 130. In the event that one of those intermediate caches 113 (A) later discards its copy of the digital content 121, it can receive another copy from the other intermediate cache 113 (B) for further delivery to end viewer premises 130.

For a second example, different portions of the digital content 121 might be delivered from the injection origin 120 to different intermediate caches 113 (A and B), and from those intermediate caches 113 (A and B) to the same end viewer premises 130. This might occur if the act of sending the digital content 121 from the injection origin 120 to the end viewer premises 130 was interrupted, such as for example by a communication link failure within the video distribution network 110 or alternatively by user action, and was later resumed and completed.

2. Distribution to Each Recipient Using the Video Distribution Network.

Whenever any sender delivers digital content 121 to any recipient within the video distribution network 110, the sender performs adaptation of the digital content 121 for that recipient. In a preferred embodiment, adaptation is performed every time digital content is sent, including every time a sender delivers digital content to either a new recipient for that content or a recipient who may have already received that content. In alternative embodiments, adaptation might be performed at a subset of these times.

Adaptation preferably is performed for all recipients, including both caching devices 111 and end viewer premises 130. This would include transfers among caching devices 111, even those the same or similar distance from the injection origin 120. However, in the context of the invention there is no particular requirement for adaptation to be performed for all possible recipients, so that in alternative embodiments, some portion of the video distribution network 110 might transmit the digital content 121 through without decrypting, fingerprinting or re-encrypting it.

More generally, at points in the video distribution network 110, the system 100 might perform one or more of the functions of decrypting, fingerprinting and re-encrypting the digital content 121, including all possible cases in which (a) decryption is performed first if it is performed at all, (b) encryption is performed last if it is performed at all, and (c) fingerprinting is performed at least once. However, it is possible that not all such combinations are necessarily useful. In the following description, those cases where fingerprinting is performed more than once are considered equivalent to cases where fingerprinting is performed exactly once. For example, not intended to be limiting in any way, in alternative embodiments the following might be performed at some point in the video distribution network 110:

- decryption, fingerprinting, and re-encryption, with the effect that the digital content 121 is adapted from a first point to a second point in the video distribution network 110 with both a fingerprint and a new key;
- decryption and re-encryption (without fingerprinting), with the effect that the digital content 121 is adapted from a first point to a second point in the video distribution network 110 with a new key but no fingerprint;
- fingerprinting and new encryption, with the effect that the digital content 121 is imported from an unencrypted form and introduced into the video distribution network 110 with an encryption key; or alternatively, with the effect that the digital content 121 is fingerprinted and has a new encryption key layered onto it;
- new encryption (without fingerprinting), with the effect that the digital content 121 is imported from an unencrypted form and introduced into the video distribution network 110 with an encryption key but no fingerprint; or alternatively, with the effect that the digital content 121 has a new encryption key layered onto it;
- decryption and fingerprinting, with the effect that the digital content 121 is made capable of presentation, such as to an end viewer, but the presentable copy is fingerprinted for each such presentation;
- decryption (without fingerprinting), with the effect that the digital content 121 is made capable of presentation, such as to an end viewer, but without fingerprinting;
- no action, with the effect that the digital content 121 is sent from a first point to a second point in the video distribution network 110 without change.

As described above, it is therefore possible as a consequence for individual end viewer premises 130 to receive digital content 121 that has been partially fingerprinted for multiple recipients. However, in a preferred embodiment, the method of fingerprinting (such as for example using a technique described in related applications for detecting collusion among multiple recipients of fingerprinted digital content) provides for detecting individual recipients anyway.

When an individual end viewer premises 130 receives the encrypted, fingerprinted digital content 121, it records that digital content 121 in a local video library 131. The local video library 131 maintains the digital content 121 in its encrypted, fingerprinted form for later distribution to one or more playback elements 132. In response to a request by an end viewer, the local video library 131 distributes the digital content 121 to one or more playback elements 132, at which the digital content 121 is substantially simultaneously decrypted and presented to end viewers for viewing.

Distribution and Adaptation

Figure 2:
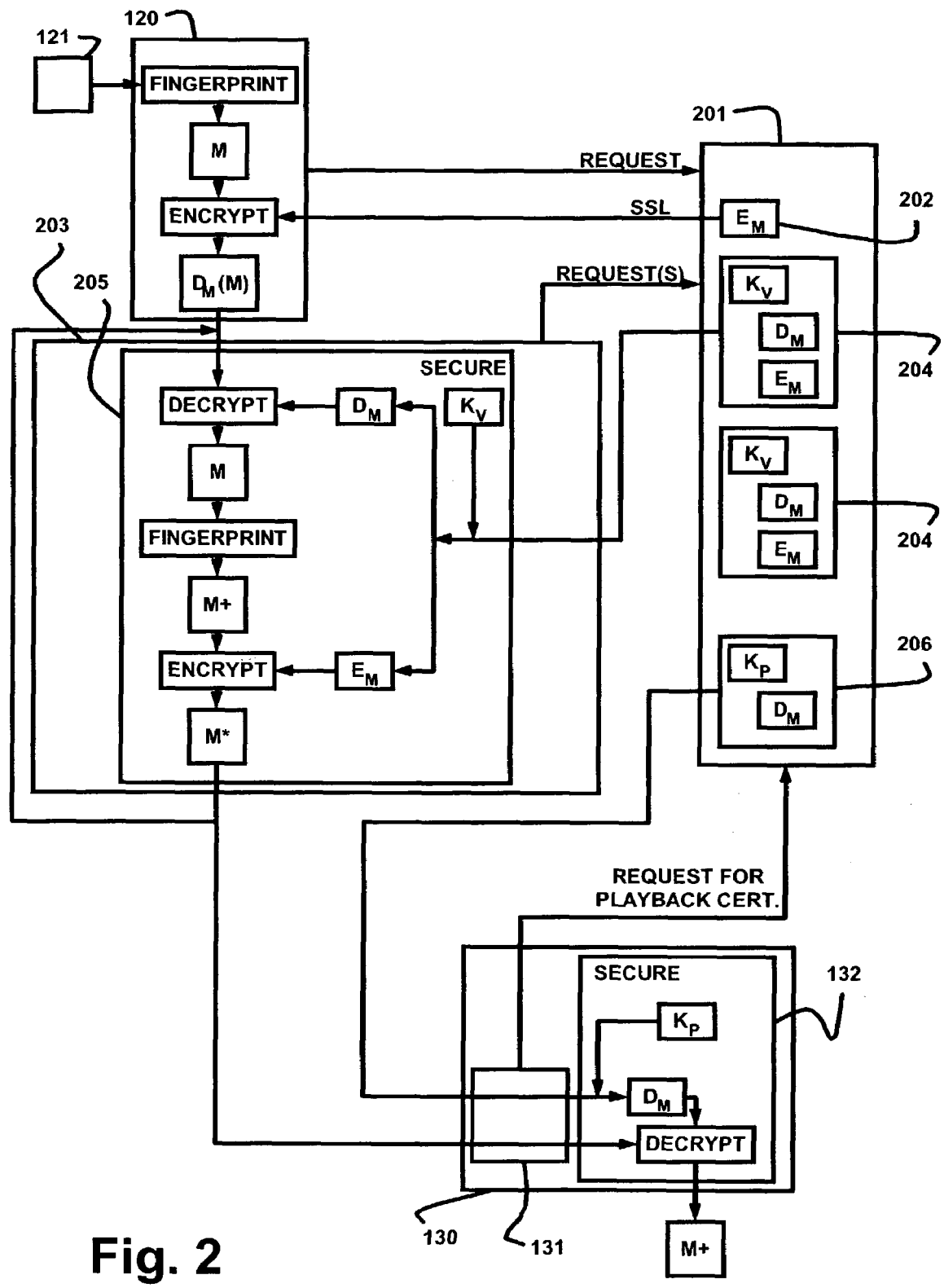
FIG. 2 shows a block diagram of a system for distribution and adaptation of digital content, including key management for parallel distribution and fingerprinting of digital content.

FIG. 2 shows a block diagram of a system for distribution and adaptation of digital content, including key management for parallel distribution and fingerprinting of digital content.

As described herein, the injection origin 120 receives digital content 121 for media streams, such as a movie, and watermarks it, producing a watermarked version of the digital content 121, labeled M in the figure.

Upon receiving the digital content 121, the injection origin 120 contacts a key server 201 using a key exchange protocol. In a preferred embodiment, the key exchange protocol uses the SSL technique for secure communication, or a similar technique.

The key server 201 generates a content encryption key 202 EM unique to the digital content 121 M. In a preferred embodiment, the key server 201 generates a content encryption key 202 $E_M$ for use with the AES-128 encryption technique, or a similar technique. The injection origin 120 uses the content encryption key 202 $E_M$ to encrypt the digital content 121, producing an encrypted and watermarked version $E_M$ (M) of the digital content 121.

In response to a request from an end viewer or to any desire to distribute the content to a cache or end viewer, for example in anticipation of requests that have not yet come, the injection origin 120 adapts its encrypted and watermarked version $E_M$ (M) of the digital content 121 for delivery to a recipient in the video distribution network 110.

1. Key Exchange and Adaptation of the Digital Content.

Each time the digital content 121 is adapted for delivery to a recipient, a key exchange occurs between a sending device 203 of the digital content 121 and the key server 201. In this key exchange, the sending device 203 requests the previous content encryption key 202 (now effectively a content decryption key $D_M$) and a new content encryption key 202 $E_M$ from the key server 201. The key server 201 generates a new content encryption key 202 $E_M$ that is unique to both the digital content 121 and the sending device 203. Preferably, the new content encryption key 202 $E_M$ is also unique to the particular transaction of sending the content; if that content is sent by the same sending device on another occasion to another, or even the same, node or end viewer, the content encryption key 202 $E_M$ is preferably different.

The key server 201 packages that new content encryption key 202 $E_M$ in an adaptation certificate message 204 $K_V$ ($D_M$; $E_M$) encrypted using a secure key $K_V$ that is restricted to a secure portion 205 of the sending device 203. In a preferred embodiment, the key server 201 generates the new content encryption key 202 $E_M$ for use with the AES-128 encryption technique or a similar technique. The secure key $K_V$ preferably is adapted for use with the AES-256 encryption technique or with a similar technique.

In a preferred embodiment, the secure portion 205 of sending device 203 includes a hardware element having a secure key $K_V$ that is restricted to that secure portion 205, and is not generally available to the rest of the sending device 203.

The key server 201 generates the adaptation certificate message 204 that includes the decrypting key $D_M$ (that is, the old content encryption key 202) that was used for encrypting the digital content 121 for delivery to the sending device 203 and the encrypting key $E_M$ (that is, the new content encryption key 202) to be used for encrypting the digital content 121 for delivery to a receiving device. In the preferred embodiment, this message also includes data to be used in fingerprinting, a message-type value and a SHA-1 message digest for added security. In alternative embodiments, other message digests besides SHA-1 might be used, such as for example other values computed in response to the content of the message and not easily reversed to retrieve the content of the message. Moreover, in alternative embodiments, other and further additional data may be included with the message, such as for example a date-stamp or time-stamp, a serial number, or other information not easily available to an attacker.

The adaptation certificate preferably is encrypted using a secure key $K_V$ that is restricted to the secure portion 205 of the sending device 203, resulting in the adaptation certificate message 204 $K_V$ ($D_M$; $E_M$). As a result, only the secure portion 205 of the sending device 203 should be able to obtain either the decrypting key $D_M$ or the encrypting key $E_M$, and the rest of the sending device 203 generally should not have access to any of these keys.

More specifically, the adaptation certificate message 204 $K_V (D_M; E_M)$ includes at least the following:

A 4-byte message-type value, indicating that the message 204 is in fact an adaptation certificate message 204. In one embodiment, the message-type value might take on one of six possible values, indicating that the message includes (1) an original content encryption key 202 $D_M$ for content from an injection point 120, (2) an adaptation content encryption key 202 $D_M$ for content from a sending device 203 other than an injection point 120, (3) a content decryption key 202 $K_P$ for decrypting a playback certificate 206, (4) a content decryption key 202 $K_V$ for adapting content M, (5) an adaptation certificate message 204, or (6) a playback certificate message 206. The message type helps prevent encrypted messages from being recorded by an attacker in one context and replayed in a different context.

The 16-byte old content encryption key 202 $D_M$.

The 16-byte new content encryption key 202 $E_M$.

A 16-byte permutation key, including a cryptographically secure indicator for a permutation of fingerprinting information.

A 16-byte fingerprinting key, including a a cryptographically secure indicator for a set of fingerprinting data.

A 20-byte SHA-1 message digest of the adaptation certificate message 204 (so far).

An 8-byte pad of zero-bits to bring the length of the adaptation certificate message 204 to 96 bytes.

The secure portion 205 of the sending device 203 responds to the adaptation certificate message 204 $K_V (D_M; E_M)$ from the key server 201, which was encrypted using the secure key $K_V$ and including both the decrypting key $D_M$ and the encrypting key $E_M$. The secure portion 205 decrypts the encrypted and watermarked version $D_M (M)$ of the digital content 121 using the decrypting key $D_M$, thus generating an unencrypted copy M of the digital content 121. The secure portion 205 partially fingerprints the unencrypted copy M of the digital content 121, thus generating an unencrypted partially fingerprinted copy M+ of the digital content 121.

The secure portion 205 re-encrypts the partially fingerprinted copy M+ of the digital content 121 using the encrypting key, thus generating a re-encrypted partially fingerprinted copy $E_M (M+)$ of the digital content 121. This re-encrypted partially fingerprinted copy $E_M (M+)$ of the digital content 121 is herein sometimes referred to as the adapted copy M* of the digital content 121.

A sending device 203 can send the adapted copy M* to another sending device for re-adaptation. This is shown in FIG. 2 by the arrow looping around the top sending device 203. In each iteration, a new decrypting key $D_M$, new encrypting key $E_M$, and new secure key $K_V$ preferably are used. Furthermore, fingerprinting information preferably is added at each level. Different amounts of fingerprinting information can be embedded in the content at different levels, depending on security considerations.

For example, in the video distribution network illustrated in FIG. 1, sending devices in the form of caches at different levels send the digital content to other caches before the content reaches end viewer premises 130. The injection point 120 might select about $10^2$ fingerprint locations when sending digital content to each one of a collection of L1 (first level) caches, the L1 caches might select about $10^4$ such locations when sending digital content to each one of about $10^3$ L2 caches, the L2 caches might select about $10^6$ such locations when sending digital content to each one of about $10^5$ L3 caches, and the L3 caches might select about $10^8$ such locations when sending digital content to each one of about $10^6$ end viewers. Fewer or more levels can be utilized when distributing the content, and fewer or more locations can be selected at each level.

Eventually, the digital content is sent to a sending device that in turn sends the content to end viewer premises 130. Such a sending device is shown as the bottom sending device 203 in FIG. 2.

2. Delivery and Playback at End Viewer Premises.

In a preferred embodiment, the adapted copy M* of the digital content 121 that is generated for the end viewer premises 130 is no longer partially fingerprinted, but is fully fingerprinted. However, in the context of the invention there is no particular requirement that the adapted copy M* of the digital content 121 that is generated for the end viewer premises 130 must be fully fingerprinted. In alternative embodiments, some of the watermarked locations at which information might be embedded in the digital content 121 may be left un-fingerprinted.

For a first example, the end viewer premises 130 might include a trusted local distributor, such as a business entity operating to rent or sell copies of the digital content 121 to retail customers. In this first example, the end viewer premises 130 would also provide for further adapting the digital content 121 when renting or selling copies of the digital content 121 to retail customers.

For a second example, the end viewer premises 130 might include a secure portion 205. In this second example, the end viewer premises 130 would also provide for further adapting the digital content 121 according to business rules embedded in, or securely downloaded to, the secure portion 205. In this second example, one such business rule would provide for further adapting the digital content 121 each time a playback certificate (as described below) was issued for the digital content 121.

Each time the digital content 121 is delivered to end viewer premises 130, a playback certificate exchange occurs between the local video library 131 and the key server 201. In this playback certificate exchange, the local video library 131 requests a playback certificate 206 from the key server 201. The key server 201 reviews business rules applicable to playback of the media stream represented by the digital content 121, and determines if playback of the media stream is allowed. If so, the key server 201 generates a playback certificate 206 for the media stream.

The playback certificate 206 $K_P, (D_M)$ includes a decrypting key $D_M$, which was used as the encrypting key $E_M$ by the leaf cache 114 when re-encrypting the partially fingerprinted copy M+ of the digital content 121 to generate the adapted copy M* of the digital content 121. In the preferred embodiment, the playback certificate 206 $K_P (D_M)$ also includes a message-type value and a SHA-1 message digest. In alternative embodiments, other message digests besides SHA-1 might be used, such as for example other values computed in response to the content of the message and not easily reversed to retrieve the content of the message. Moreover, in alternative embodiments, other and further additional data may be included with the message, such as for example a date-stamp or time-stamp, a serial number, or other information not easily available to an attacker. The playback certificate 206 $K_P (D_M)$ is itself encrypted using a secure playback key $K_P$ specific to the playback element 132 for which the playback certificate 206 is issued. In a preferred embodiment, the secure playback key $K_p$ is adapted for use with the AES-256 encryption technique, or a similar technique.

More specifically, the playback certificate message 206 $K_p$ ($D_M$) includes at least the following:

A 4-byte message-type value, indicating that the message 204 is in fact an playback certificate message 206.

The 16-byte old content encryption key 202 $D_M$.

An 16-byte output format word, indicating whether the content is low resolution (640×480, 704×480, or NTSC), medium resolution (1280×720), or high resolution (1920×1080), and indicating whether the content is in an output mode that is analog (without copy protection), analog (with "Macrovision" copy protection), DVI (without copy protection), or DVI (with "HDCP" copy protection).

A 20-byte SHA-1 message digest of the playback certificate message 206 (so far).

An 8-byte pad of zero-bits to bring the length of the playback certificate message 206 to 64 bytes.

When the local video library 131 at the individual end viewer premises 130 has obtained both the playback certificate 206 $K_P$ ($D_M$), and the adapted copy M* of the digital content 121, equal to the re-encrypted fingerprinted copy $D_M$ (M+) of the digital content 121, it is able to deliver those data to the playback element 132 having the secure playback key $K_P$, which is able to decrypt and decode the adapted copy M* of the digital content 121, and present the unencrypted fingerprinted copy M+ of the digital content 121 to end viewers.

Method of Operation

Figure 3:
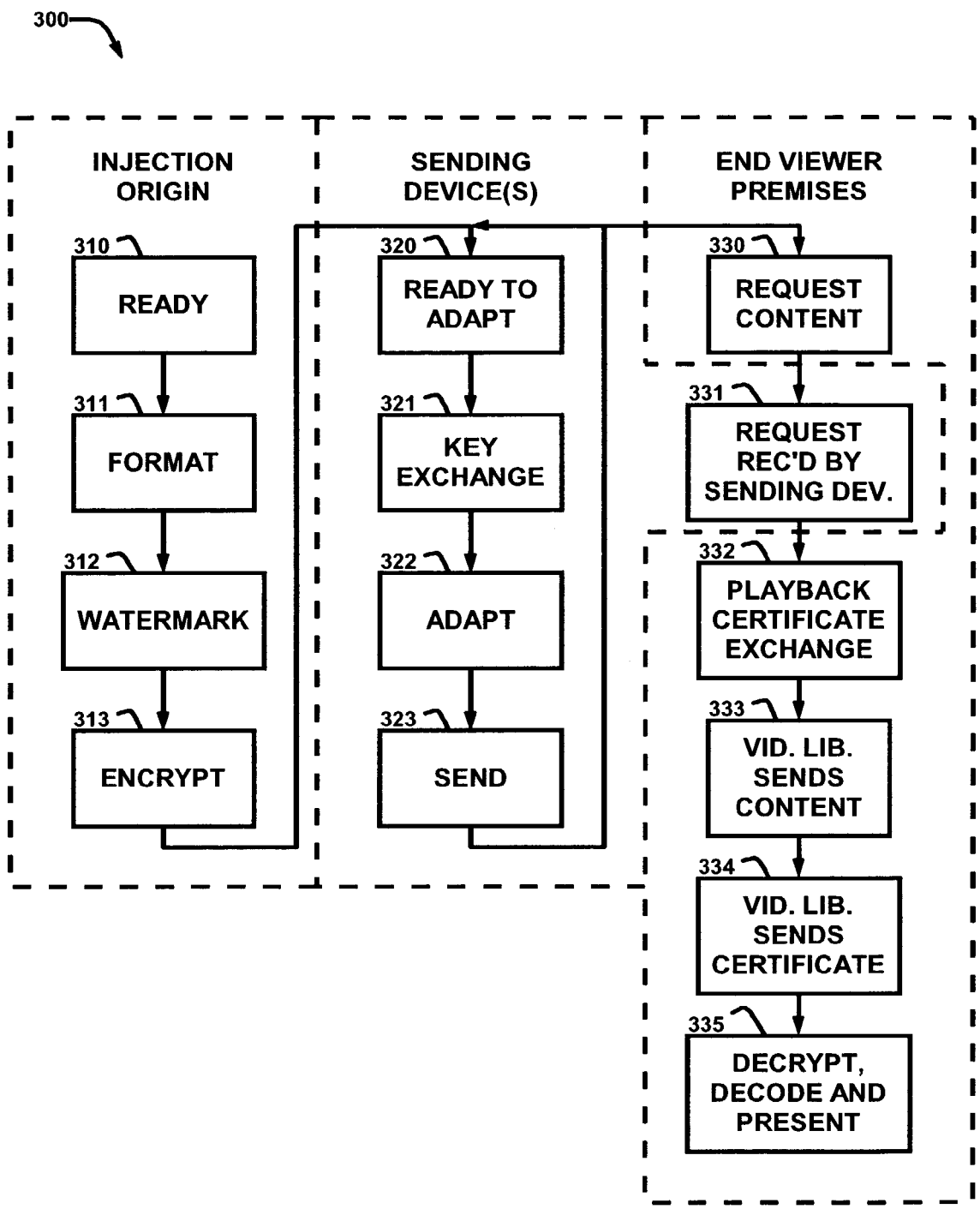
FIG. 3 shows a process flow diagram of a method for distribution of digital content, including parallel distribution and fingerprinting of digital content.

FIG. 3 shows a process flow diagram of a method for distribution of digital content, including parallel distribution and fingerprinting of digital content.

In FIG. 3, the preferred location for performing each step is indicated by the labels "Injection Origin," "Sending Device(s)," and "End Viewer Premises," along with the accompanying dashed-line boxes. While this division is preferred, the invention encompasses embodiments in which the steps are performed at other locations than those shown.

Furthermore, although described serially, the flow points and method steps of the method 300 can be performed by separate elements in conjunction or in parallel, whether asynchronously or synchronously, in a pipelined manner, or otherwise. In the context of the invention, there is no particular requirement that the method must be performed in the same order in which this description lists flow points or method steps, except where explicitly so stated.

1. Receiving Digital Content.

At a flow point 310, the injection origin 120 is ready to receive digital content 121 for media streams.

At a step 311, the injection origin 120 formats the digital content 121.

At a step 312, the injection origin 120 watermarks the digital content 121, as described in a related application, "WATERMARKING AND FINGERPRINTING DIGITAL CONTENT USING ALTERNATIVE BLOCKS TO EMBED INFORMATION".

At a step 313, the injection origin 120 encrypts the digital content 121 for storage. To perform the step, the injection origin 120 conducts a key exchange with the key server 201. This key exchange includes the following sub-steps:

(A) The injection origin 120 requests a new content encryption key 202 $D_M$ from the key server 201. An SSL message exchange governs the request for a new content encryption key 202 $D_M$, and the response providing the new content encryption key 202 $D_M$.

(B) The key server 201 generates the new content encryption key 202 $D_M$, specific to the particular digital content 121. In a preferred embodiment, the key server 201 generates the new content encryption key 202 $D_M$ for use with the AES-128 encryption technique, or a similar technique.

(C) The key server 201 sends the new content encryption key 202 $D_M$ to the injection origin 120.

(D) The injection origin 120 uses the content encryption key 202 $D_M$ to encrypt the digital content 121, producing an encrypted and watermarked version $D_M$ (M) of the digital content 121.

2. Adapting and Sending Digital Content.

At a flow point 320, a sending device 203 in the video distribution network 110 is ready to adapt and send the digital content 121 to a receiving device 203.

At a step 321, the sending device 203 conducts a key exchange with the key server 201. This key exchange includes the following sub-steps:

(A) The sending device 203 requests a new content encryption key 202 from the key server 201.

(B) The key server 201 generates a new content encryption key 202 $E_M$ that is unique to both the digital content 121 and the sending device 203, and preferably also unique to the particular transaction of sending the digital content.

(C) The key server 201 packages the new content encryption key 202 $E_M$ in the adaptation certificate message 204 $K_V$ ($D_M$; $E_M$) encrypted using a secure key $K_V$ that is restricted to a secure portion 205 of the sending device 203.

(D) The key server 201 sends the adaptation certificate message 204 $K_V$ ($D_M$; $E_M$) to the sending device 203.

(E) The sending device 203 delivers the adaptation certificate message 204 $K_V$ ($D_M$; $E_M$) to a secure portion 205 at the sending device 203.

At a step 322, the sending device 203 adapts the digital content 121 for delivery to the receiving device. This adaptation includes the following sub-steps:

(A) The secure portion 205 at the sending device 203 retrieves its secure key $K_V$, and decrypts the adaptation certificate message 204 $K_V$ ($D_M$; $E_M$).

(B) The secure portion 205 uses the old content encryption key 202 $D_M$ to decrypt the digital content 121 M.

(C) The secure portion 205 partially fingerprints the digital content 121 M, thus generating partially fingerprinted digital content 121 M+.

(D) The secure portion 205 re-encrypts the partially fingerprinted digital content 121 M+ using the new content encryption key 202 $E_M$, thus generating the adapted digital content 121 M*.

At a step 323, the sending device 203 sends the adapted digital content 121 M* to the receiving device 203.

Digital content can be sent from one sending device to another sending device, for example from one cache to another cache in a video distribution network. Thus, flow can proceed from step 323 back to step 320 for re-adaptation, as indicated by the arrow between these two steps in FIG. 3. Different keys and locations for embedding fingerprint information preferably are used at each sending device. At some point, the digital content preferably is sent to an end viewer premises for presentation, as indicated by the arrow from step 323 to step 330.

3. Decoding and Presenting Digital Content.

At a flow point 330, the individual end viewer premises 130 requests digital content 121 for presenting media streams represented by that digital content 121 to one or more end viewers. This step can be performed responsive to a request for content by an end viewer at the end viewer premises, in anticipation of demand by an end viewer, or for some other reason.

At a step 331, the request for digital content 121 is received by at least one caching device 111 (preferably a leaf cache 114) in the video distribution network 110.

At a step 332, the local video library 131 conducts a playback certificate exchange with the key server 201. The playback certificate exchange includes the following substeps:

The local video library 131 requests a playback certificate 206 from the key server 201.

The key server 201 reviews business rules applicable to playback of the media streams represented by the digital content 121, and determines if playback of the media streams is allowed. If so, the method 300 continues with the substep (C).

The key server 201 generates a playback certificate 206 for the digital content 121 representing the media stream.

The key server 201 sends the playback certificate 206 to the local video library 131.

At a step 333, the local video library 131 at individual end viewer premises 130 sends the digital content 121 in its encrypted, fingerprinted form to one or more playback elements 132.

At a step 334, the local video library 131 sends the playback certificate 206 to those playback elements 132.

At a step 335, playback elements 132 (if able to use the playback certificate 206) decrypt and decode the digital content 121, and concurrently present the media streams represented by that digital content 121.

Generality of the Invention

The invention is useful for, and has sufficient generality for, applications other than distribution of media streams. For example, the invention can be applied to software, data streams generated in real-time such as virtual reality simulations, digitized analog content, and to other content. In addition, the invention is not limited to distribution of content, but rather is also applicable to other settings. For example, the invention is also generally useful for applications in which security of datasets or identifying recipients of those datasets is desired.

Furthermore, the invention is described herein using symmetric encryption, in which a same key is used for encryption and decryption. However, the invention can be implemented using asymmetric encryption (such as for example, public key encryption) without undue experimentation or further invention. Therefore, any single key described in this disclosure (including the claims) as both encrypting and decrypting content should be read to encompass the respective keys of a asymmetric key pair (such as for example, a public key/private key pair).

Although preferred embodiments are disclosed herein, many variations are possible which remain within the concept, scope, and spirit of the invention. These variations would become clear to those skilled in the art after perusal of this application.

Those skilled in the art will recognize, after perusal of this application, that these alternative embodiments are illustrative and in no way limiting.

The invention claimed is:

1. A method, including steps of:
generating, in response to digital content, watermarked digital content having a set of locations therein at which fingerprinting information can be embedded;
distributing said digital content using a multi-source system, said multi-source system including at least one point of origin and at least one intermediate device disposed between said point of origin and an end viewer; and
partially fingerprinting said digital content at each intermediate device when sending information for presentation to said end viewer, whereby the partially-fingerprinted digital content is generated at each said intermediate device, and includes information sufficient to identify that intermediate device and a recipient of that partially-fingerprinted digital content from that intermediate device.

2. A method as in claim 1, wherein said digital content includes a representation of a media stream.

3. A method as in claim 1, wherein said plurality of sources are disposed in a tiered structure.

4. A method as in claim 3, wherein an amount of fingerprinting at each source is responsive to a position of that source in the tiered structure.

5. A method as in claim 1, wherein said steps of partially fingerprinting include steps of:
decrypting said digital content with a first key, whereby decrypted digital content is generated;
partially fingerprinting said decrypted digital content with that set of fingerprinting information that identifies its sender and is also sufficient to identify a recipient, whereby that set of fingerprinted digital content is generated; and
encrypting said fingerprinted digital content with a second key.

6. A method as in claim 5, wherein said first key and said second key are supplied by a key server.

7. A method as in claim 6, wherein for each intermediate device, said first key and said second key are supplied in a message encrypted with a third key.

8. A method as in claim 7, wherein the third key for each intermediate device is stored in a secure portion of the intermediate device.

9. A method as in claim 5, wherein said first key is distinct from said second key.

10. A method as in claim 1, wherein said steps of partially fingerprinting include steps of:
decrypting said digital content with a first key, whereby decrypted digital content is generated;
partially fingerprinting said decrypted digital content with that set of fingerprinting information that identifies its sender and is also sufficient to identify a transaction in distributing said digital content, whereby that set of fingerprinted digital content is generated; and
encrypting said fingerprinted digital content with a second key.

11. A method as in claim 10, wherein said first key and said second key are supplied by a key server.

12. A method as in claim 10, wherein for each intermediate device, said first key and said second key are supplied in a message encrypted with a third key.

13. A method as in claim 12, wherein the third key for each intermediate device is stored in a secure portion of the intermediate device.

14. A method as in claim 10, wherein said first key is distinct from said second key.

15. A method as in claim 10, wherein playback to the end viewer is responsive to a playback certificate.

16. A method as in claim 15, wherein the playback certificate is issued by a key server.

17. A method as in claim 16, wherein the playback certificate is encrypted with a playback certificate key.

18. A method as in claim 17, wherein the playback certificate key is stored in a secure portion of an end viewer premises disposed to present the digital content to the end viewer.

19. A method as in claim 16, wherein the key server issues the playback certificate responsive to business rules.

20. A method as in claim 19, wherein the business rules are responsive to the digital content and to the end viewer.

21. A method as in claim 1, including steps of
maintaining the partially-fingerprinted digital content at each intermediate device in anticipation of requests; and
in response to requests for digital content not available at one intermediate device, requesting a copy of the digital content from another intermediate device or from the point of origin.

22. A method as in claim 1, wherein the set of fingerprinting information added by each point of origin or intermediate device is sufficient to identify both that point of origin or intermediate device and the end viewer.

23. A method as in claim 3, wherein points of origin occupy a highest tier, any intermediate devices occupy are organized into a series of lower tiers, and end viewers occupy a lowest tier.

24. A method as in claim 23, wherein
said intermediate devices cache said partially-fingerprinted digital content;
end viewer requests for said digital content are forwarded to successively higher tiers until a source with a copy of said digital content is found; and
said digital content is sent to said end viewer after said source partially fingerprints said digital content with said fingerprinting information to identify said end viewer.

25. A method as in claim 1, wherein the set of fingerprinting information uniquely identifies a specific instance of transmission of said digital content to said end viewer.

26. A method as in claim 3, wherein locations for adding the set of fingerprinting information at each intermediate device is responsive to a position of that intermediate device in the tiered structure.

27. A method as in claim 1, wherein an amount of fingerprinting information added at each intermediate device is responsive to a position of that intermediate device in the tiered structure.

28. A method as in claim 1, wherein an amount of said fingerprinting information added at each intermediate device is responsive to a number of potential recipients of said digital content from that intermediate device.

29. A method as in claim 1, wherein said at least one intermediate device includes at least one caching authority; and wherein
said point of origin or said caching authority stores one or more versions of the partially-fingerprinted digital content;
said fingerprinting information is unique to said end viewer; and
said fingerprinting information is added in advance of requests for the digital content being received.

30. A method as in claim 1, wherein different portions of the digital content are be delivered from a point of origin to different intermediate devices, and from those intermediate devices to a same end viewer.

31. A method as in claim 3, wherein intermediate devices obtain a copy of said digital content from said point of origin or another intermediate device at a same tier or a higher tier as that intermediate device, either in response to a request for such content, or in anticipation of such requests.

32. A computer readable medium having software for an intermediate device disposed between a point of origin for digital content and an end viewer, which:
when sending information to another intermediate device or to an end viewer, partially fingerprints said digital content, wherein the partially finger-printed digital content sent includes information sufficient to identify the node at which that digital content is received;
maintains partially fingerprinted digital in anticipation of requests; and
upon receiving requests for digital content not available at an intermediate node, requests a copy of that digital content from the point of origin or another intermediate device.

33. A computer readable medium having software for an intermediate de-vice disposed between a point of origin for digital content and an end viewer, which:
when sending information to another intermediate device or to an end viewer, decrypts said digital content with a first key, partially fingerprints said digital content, wherein the partially fingerprinted digital content includes information sufficient to identify the node at which that digital content is received, and encrypts said fingerprinted digital content with a second key;
maintains encrypted and partially fingerprinted digital content in anticipation of requests; and
upon receiving requests for digital content not available at an intermediate node, requests a copy of that digital content from the point of origin or another intermediate device.

34. A method as in claim 1, including steps of
maintaining partially-fingerprinted digital content at one or more intermediate nodes in anticipation of requests for that digital content; and
in response to a request for digital content not available at an intermediate node, requesting a copy of that digital content from another device.

* * * * *

UNITED STATES PATENT AND TRADEMARK OFFICE
CERTIFICATE OF CORRECTION

PATENT NO. : 7,111,171 B2  Page 1 of 1
APPLICATION NO. : 10/356692
DATED : September 19, 2006
INVENTOR(S) : Daniel A. Collens, Stephen Watson and Michael A. Malcolm It is certified that error appears in the above-identified patent and that said Letters Patent is hereby corrected as shown below:

Col. 15, line 48-51, should read:

27. A method as in claim 3, wherein an amount of fingerprinting information added at each intermediate device is responsive to a position of that intermediate device in the tiered structure.

Signed and Sealed this

Twenty-ninth Day of July, 2008

JON W. DUDAS
*Director of the United States Patent and Trademark Office*